No. 674,525. Patented May 21, 1901.
H. H. TURNER & V. CLARK.
PHOTOGRAPHIC SHUTTER.
(Application filed Sept. 7, 1899.)
(No Model.) 3 Sheets—Sheet 1.
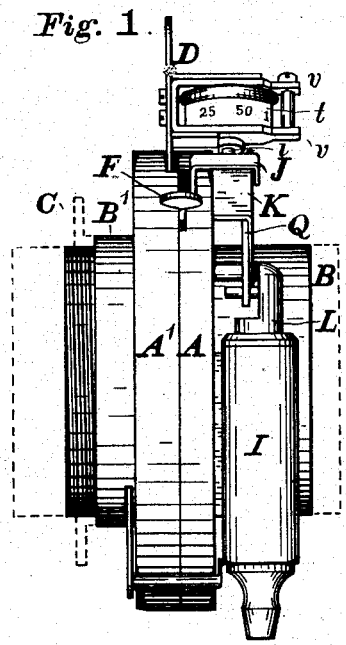
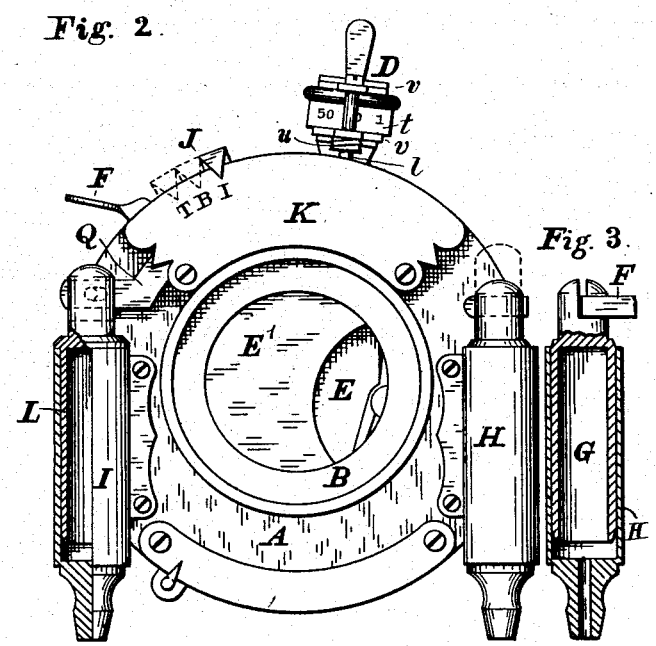
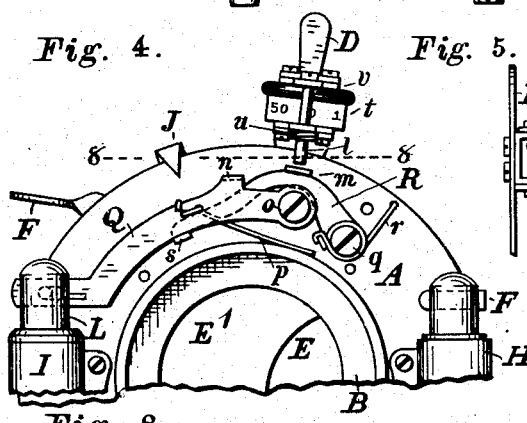
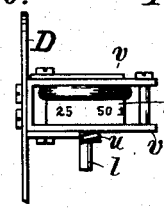
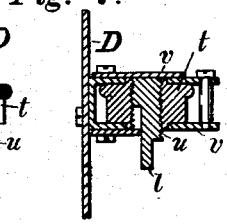
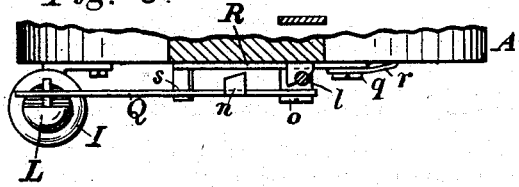
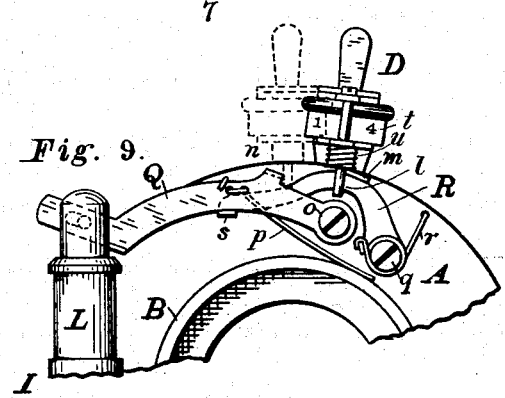
WITNESSES:
G. S. Dey.
C. G. Crannell.
INVENTORS,
Henry H. Turner and Victor Clark,
BY Geo. B. Selden,
ATTORNEY.
THE NORRIS PETERS CO., PHOTO-LITHO., WASHINGTON, D. C.

No. 674,525. Patented May 21, 1901.
H. H. TURNER & V. CLARK.
PHOTOGRAPHIC SHUTTER.
(Application filed Sept. 7, 1899.)

(No Model.) 3 Sheets—Sheet 2.

WITNESSES:
G. S. Dey.
C. G. Crannell.

INVENTORS,
Henry H. Turner and
Victor Clark,
By Geo. B. Selden,
ATTORNEY.

THE NORRIS PETERS CO., PHOTO-LITHO., WASHINGTON, D. C.

No. 674,525. Patented May 21, 1901.
H. H. TURNER & V. CLARK.
PHOTOGRAPHIC SHUTTER.
(Application filed Sept. 7, 1899.)
(No Model.) 3 Sheets—Sheet 3.
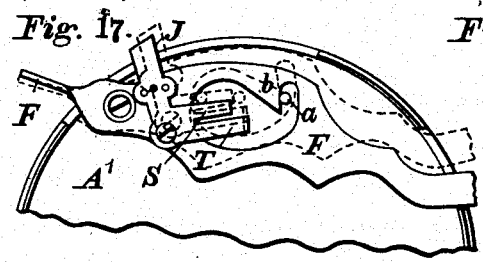
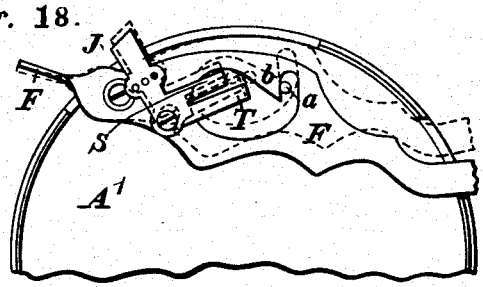
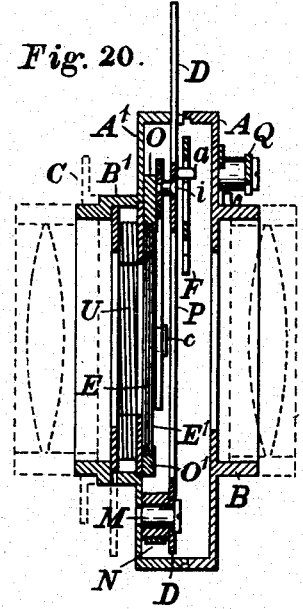
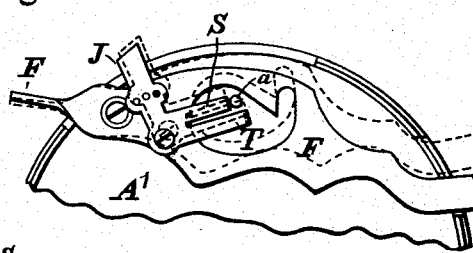
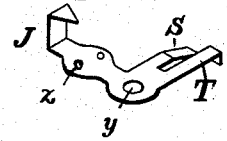
WITNESSES:
G. S. Dey.
C. G. Crannell.
INVENTORS.
Henry H. Turner and Victor Clark,
BY Geo. B. Selden,
ATTORNEY.
THE NORRIS PETERS CO., PHOTO-LITHO., WASHINGTON, D. C.

UNITED STATES PATENT OFFICE.

HENRY H. TURNER AND VICTOR CLARK, OF ROCHESTER, NEW YORK, ASSIGNORS TO THE GUNDLACH OPTICAL COMPANY, OF SAME PLACE.

PHOTOGRAPHIC SHUTTER.

SPECIFICATION forming part of Letters Patent No. 674,525, dated May 21, 1901.

Application filed September 7, 1899. Serial No. 729,742. (No model.)

*To all whom it may concern:*

Be it known that we, HENRY H. TURNER and VICTOR CLARK, citizens of the United States, residing at Rochester, New York, have jointly invented certain Improvements in Photographic Shutters, of which the following is a specification, reference being had to the accompanying drawings.

Our improvements relate to certain improvements in photographic shutters whereby the construction and operation of the same are cheapened and facilitated and the manipulation simplified.

Our improvements are fully described and illustrated in the following specification and the accompanying drawings, the novel features thereof being specified in the claims annexed to the said specification.

Figure 10:
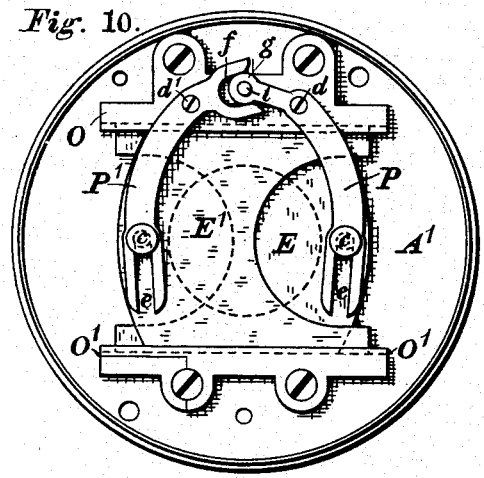
Figure 11:
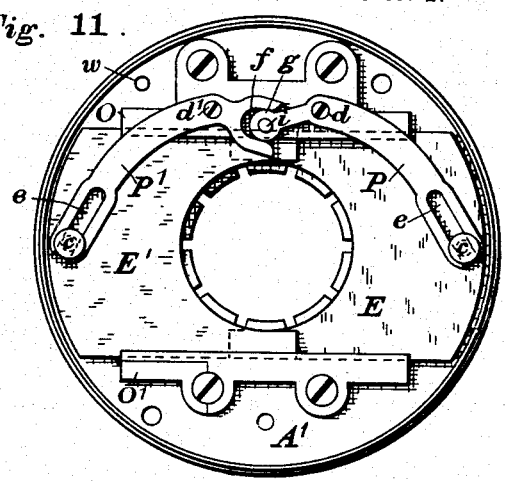
Figures 12, 13, 14:
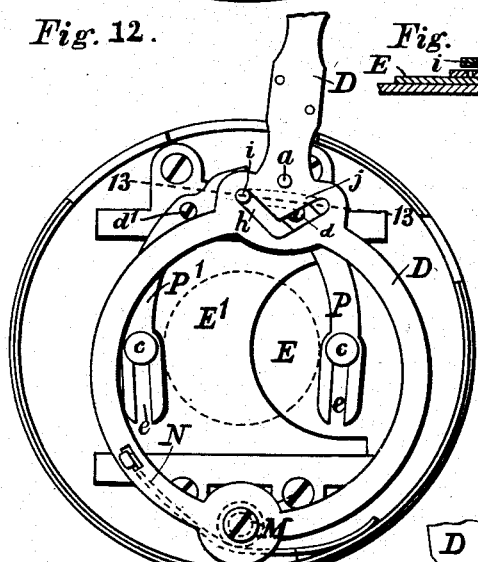
Figure 15:
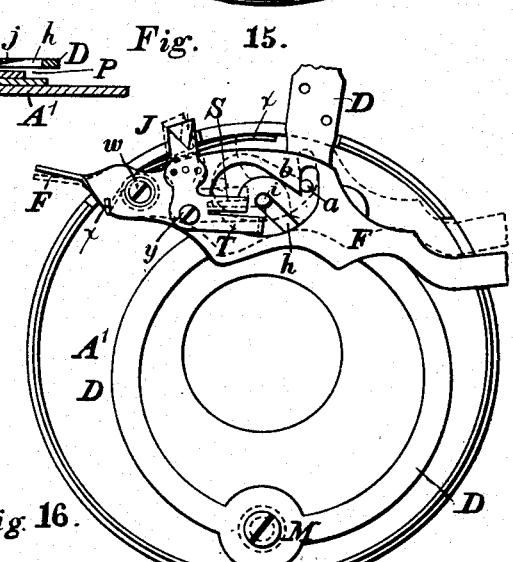
Figure 16:
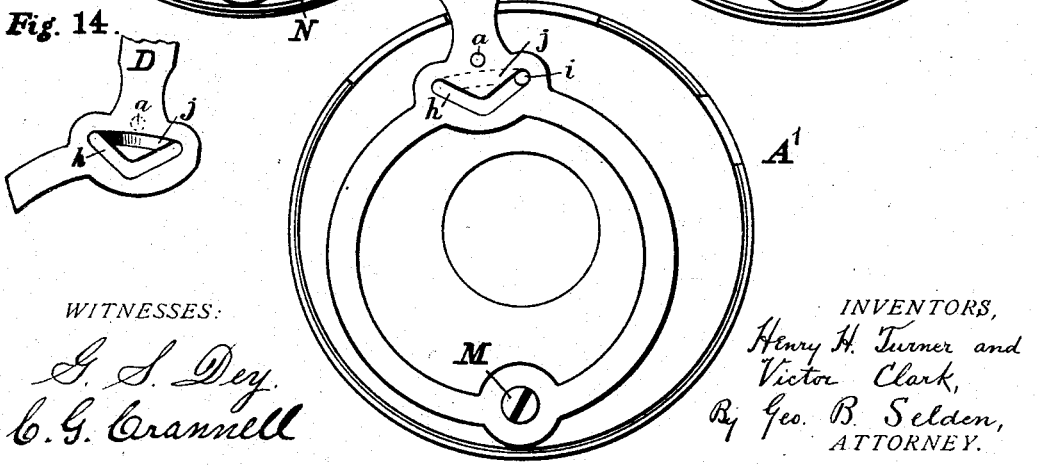

In the accompanying drawings, representing our improved shutter, Figure 1 is a side elevation. Fig. 2 is a front elevation, the shutter being represented as set for instantaneous exposures. Fig. 3 is a central vertical section of the air-cylinder which releases the shutter. Fig. 4 is a partial front elevation of the shutter, the covering-plate being omitted and the parts set for an instantaneous exposure. Fig. 5 is a side view of the device for timing instantaneous exposures. Fig. 6 is a front elevation of the same. Fig. 7 is a central vertical section of the same on the line 7 7, Fig. 6. Fig. 8 is a section on the line 8 8, Fig. 4, showing the parts below that line. Fig. 9 is a broken elevation showing the position of the device for instantaneous exposures after the setting of the operating-lever. Fig. 10 is a front view of the exposing-blades closed, the front plate being omitted. Fig. 11 represents the same open. Fig. 12 is a front view of the exposing-blades closed and the actuating-lever set, the front plate being omitted. Fig. 13 is a horizontal section on the line 13 13, Fig. 12. Fig. 14 is a partial view of the actuating-lever as seen from the rear side. Fig. 15 is a front view representing the actuating-lever and the releasing-lever set for instantaneous exposures, the front plate being omitted. Fig. 16 is an elevation showing the position of the actuating-lever after an exposure. Fig. 17 is a front view representing the releasing-lever and time-exposure lever set for bulb exposures. Fig. 18 represents the same set for time exposures. Fig. 19 represents the same in the positions these parts occupy when the blades are open during a time exposure. Fig. 20 is a central vertical section. Fig. 21 represents the time-exposure lever detached.

Our improved photographic shutter is represented in the accompanying drawings as applied to the lens-mount between the lenses, as indicated in Fig. 20; but it will be obvious that it can be used in other positions.

A A' represent, respectively, the front and rear plates or casings, which are flanged or otherwise arranged, so as to inclose the operating parts, suitable openings being provided for the various levers.

B B' are flanges for the lenses, which may be screwed into place or otherwise secured. The plates are attached together by suitable screws.

C represents the usual flange by which the lens-mount is secured to the camera-front.

D is the actuating-lever, by the movement of which from right to left in Fig. 2 the exposing-blades E E' are opened and closed, so as to permit the light to pass through the lens to produce the exposure.

F is the exposure or releasing lever, the outer ends of which project beyond the casing for the purpose of operating the shutter either directly by hand or by the plunger G, Fig. 3, in the air-cylinder H, which is connected by a flexible tube to a compressible bulb, as ordinarily practiced.

I is the dash-pot, which serves to lengthen or prolong the duration of the automatic or instantaneous exposures.

J is the adjustable lever by which the shutter is set for time, bulb, or instantaneous exposures.

K is a cover attached to the front plate and serving to protect the instantaneous-exposure-timing mechanism. (Shown in Figs. 4, 8, and 9.)

The actuating-lever D is pivoted to the rear plate at M and extends thence upward in curved form around one or both sides of the exposure-opening.

N, Figs. 12 and 20, is the actuating-spring, which gives the lever D a constant tendency to move from right to left in Figs. 2, 4, and 12. In the arrangement shown N is a leaf-spring which bears against the inside of the case at its outer end, against a stud or boss on the screw M near its middle, and has a lip or projection on one side at its inner end, which engages in a hole in the actuating-lever. A pin $a$, Figs. 12, 13, and 20, projects forward from the actuating-lever and engages with a catch $b$ on the exposing-lever F, so that when set by a movement from left to right the actuating-lever will be held in the set position, as indicated in Fig. 15, until released by a movement of the exposing-lever, which is pivoted at $w$ to the plate A'. A spring $x$ is applied to the exposing-lever in any suitable way.

O O', Figs. 10 and 11, are guides for the exposing-blades E E', which slide freely in said guides, opening and closing, as indicated in the said figures, to produce the exposure. Each of the blades is provided on its inner edge with a circular recess of a size and shape adapted to permit the light to pass through the whole area of the exposure-orifice when the blades are open. The guides O O' are attached to the rear plate by screws or in any other suitable way. On their inner edges the guides are provided with suitable grooves in which the blades slide. Each blade is provided with a stud or pin $c$, which engages in a slot $e$ in one of the pivoted operating-arms P P', which receive movement from the actuating-lever D. The operating-arms P and P' are pivoted at $d$ $d'$, Figs. 10 and 11, respectively, to the rear plate A' or to one of the guides on opposite sides of the central vertical plane. The outer ends of the levers are provided with the slots $e$, which engage with the pins $c$ on the blades. The inner ends of the arms are connected together by any suitable form of joint which will compel their simultaneous movement in opposite directions from or to the medial plane. In the construction shown the arm P' is provided with a slot $f$, in which a head or lug $g$ on the other arm engages, so that when one arm moves in one direction the other is compelled to move in the other. Any other suitable form of connections between the arms may be employed. In a modification the blades are fastened to the arms, the guides are omitted, and the blades swing freely about the pivots $d$ $d'$, opening and closing the exposure-orifice by their to-and-fro movements. This modified construction is cheaper and avoids the friction of the pins in the slots in the arms and of the blades in the guides. The requisite vibrating movement is imparted to the operating-arms from the actuating-lever by the V-shaped slot $h$ in the lever and the pin $i$ in one of the arms.

The operation will be readily understood from Fig. 12, where it will be seen that since the pin $i$ on one of the arms engages in the V-shaped slot $h$ in the actuating-lever the movement of the lever from right to left will cause the pin to move inward and then outward, thereby opening and closing the blades, as already described. As shown, the slot $h$ in the actuating-lever D is inclined diagonally inward and then outward, so that as the lever swings the pin $i$ must move first inward and then outward, thus imparting the requisite to-and-fro movement to the arms and blades. When the lever is shifted during the setting operation to the set position, the pin $i$ does not travel in the V-shaped slot $h$, but in the pathway $j$, Figs. 13 and 14, on the rear side of the lever which connects the ends of the V-shaped slot together and has an inclined bottom which causes the lever to spring laterally during its setting movement, so that the pin is not then engaged in the V-shaped slot. The end of the pin $i$ is beveled, as indicated in Figs. 13 and 20, and the bottom of the pathway $j$ is inclined, as shown in Fig. 13. When the actuating-lever is shifted from left to right, the end of the pin $i$ travels in the pathway $j$, the inclined bottom of which causes the lever to spring forward until at the end of the movement it springs back again, so as to engage the pin in the slot, ready then to operate the blades and effect an exposure on the next traverse of the lever from right to left. The pathway $j$ is curved from the center M to permit the free movement of the lever.

The mechanism for graduating the length of automatic or instantaneous exposures will be understood from Figs. 4 to 9, inclusive. The duration of such exposures is timed by the dash-pot I, the lever Q, and the adjustable detent or pin $l$ on the actuating-lever D. For the ordinary instantaneous exposures the dash-pot is not used. In this case the adjustable pin $l$ is retracted or withdrawn outward to its outermost position, and it swings to and fro without coming in contact with any other parts. When, however, it is desired to regulate the length of instantaneous exposures, the pin $l$ is shifted inward, so that during the setting operation it comes in contact with the lug $m$ on the lever R and shifts it and the lever Q, so as to raise the plunger L in the dash-pot I, so that the movement of the actuating-lever will be gradually retarded by the escape of the air from the dash-pot while the pin $l$ is in contact with the lug $n$ on the dash-pot lever Q. As the air escapes from the dash-pot the lever Q and its lug $n$ move gradually inward out of the path of the pin $l$, and the exposure is then terminated. The dash-pot cylinder I is attached to the case in any suitable manner. The plunger L fits the cylinder I snugly, but is free to move therein. At its upper end the plunger L is jointed to the lever Q, which is pivoted at $o$ to the case $p$, Figs. 4 and 9. $p$ is a spring arranged in any suitable way to press the plunger L into the dash-pot. The lever R is pivoted to the case at $q$, and it may also be provided with a suitable spring $r$, arranged to press the outer end of the lever inward. The lever R is provided with a lug s, which engages underneath the dash-pot lever Q, so that when the lever R is shifted by the pin l coming in contact with the lug m during the setting movement of the actuating-lever the lever Q will be raised and the plunger L drawn out in the dash-pot I. The duration of the instantaneous exposure will depend upon the length of time the pin l remains in contact with the lug n, and this will obviously depend upon the position in radial adjustment of the point of the pin l. When the pin is so adjusted, as indicated in Fig. 4, that it travels outward of the lug m on the lever R, there will be no lengthening or retarding of the instantaneous exposure and the dash-pot will not be called into use at all. When, however, the pin is adjusted radially inward, it comes in contact with the lug m when the lever is being set and shifts the lever R, and this shifts the lever Q so as to draw the plunger L outward in the dash-pot and so that as the pin l returns during the exposing movement of the actuating-lever it will be arrested or retarded by contact with the lug n on the lever Q, which gradually moves out of the way as the air escapes from the dash-pot. It will be obvious that the farther inward the pin l is adjusted the longer it will remain in contact with the lug n and the more the exposure can be prolonged, which of course can be regulated and indicated by a suitable graduation or scale applied to the adjusting mechanism of the pin l. The air escapes from the dash-pot around the plunger at a rate which is sensibly constant for any particular construction, so that the scale of the timing is easily arranged. The position of the parts while the pin l is engaged with the dash-pot lever is shown by the dotted lines in Fig. 9, from which it will be readily seen that the duration of the contact will depend on the radially-adjusted position of the point of the pin.

Any suitable means may be employed for adjusting the detent or pin l radially inward or outward on the actuating-lever. In the construction shown there is a nut t, internally threaded and engaging with a screw-thread u on a stem carrying the pin l. By turning the nut the pin l is adjusted radially in and out. Any suitable graduation may be applied to the nut to indicate that the exposure when the nut is properly set with some non-revoluble part is a quarter, a fiftieth, or other fraction of a second, as may be preferred. The nut t is supported on the actuating-lever by a suitable arm or arms v. These arms may be connected together outside the stem or otherwise arranged to support the adjustable timing-pin on the actuating-lever.

For time and bulb exposures the lever J and its adjuncts are pivoted on the exposing-lever F, which is arranged to be worked at one end by hand and at the other by the ordinary pneumatic bulb. The time and bulb exposure lever J is pivoted to the releasing-lever F at y, Fig. 15, and its inner ends are so arranged that when properly set they interpose themselves in the path of a pin or detent on the actuating-lever and arrest its motion either while the bulb is held compressed or until it is again compressed, as may be necessary for either bulb or time exposures. The construction of the time or bulb exposure lever will be understood from Figs. 17, 18, 19, and 21. There is an adjustable outside thumb-piece or handle which may be set to any suitable marks on the case or the cover—such, for instance, as T B I, indicating, respectively, time exposures, bulb exposures, and instantaneous exposures, the latter of course being timed in duration by the mechanism already described, if desired. The shape of the lever J will be understood from Fig. 21. It is pivoted at y to the exposing-lever F, and it may be provided with lugs or notches z, which engage with corresponding notches or projections on the lever, so as to hold it in place in any of its positions of adjustment. For instantaneous exposures the pin a on the actuating-lever passes over the inner ends S and T of the time-lever J without contact with them, such arrangement being indicated in Fig. 15. For bulb exposures the lever J is set so that the arm S is interposed in the path of the pin a and arrests the movement of the actuating-lever with the blades open until the pressure on the bulb being released the lever F falls, the arm S is moved out of contact with the pin, and the blades close. The operation will be understood from Fig. 17. For time exposures the arm T is interposed in the path of the pin, and as the lever F falls the pin slips off of the end of the arm T and immediately engages with the end of the arm S, by which it is held, (see Fig. 19,) the blades remaining open until another movement of the lever F raises the arm S out of contact with the pin and permits the blades to close. The arm S is shorter than T, and their ends are bent or offset, as indicated in Fig. 21.

The iris-diaphragm is preferably applied immediately behind the shutter.

We claim—

1. In a photographic shutter, the combination, with the movable exposing-blades, connected together so as to open and close simultaneously, of the swinging spring-pressed actuating-lever, provided with the V-shaped slot and with the inclined pathway connecting the ends of the slot, as and for the purposes described.

2. In a photographic shutter, the combination, with the movable exposing-blades, connected together so as to open and close simultaneously, of the swinging spring-pressed actuating-lever, provided with the V-shaped slot and with the inclined pathway connecting the ends of the slot, and the pivoted exposing-lever provided with a suitable catch, as and for the purposes set forth.

3. In a photographic shutter, the combination, with the movable exposing-blades, connected together so as to open and close simultaneously, of the swinging spring-pressed actuating-lever, provided with the V-shaped slot and the inclined pathway connecting the ends of the slot, the pivoted exposing-lever provided with a suitable catch, and the pivoted time-exposure lever carried by the exposing-lever, as and for the purposes set forth.

4. In a photographic shutter, a casing, exposing-blades movable therein, an actuating-lever pivoted in the casing and adapted to operate the exposing-blades, and means supported in the casing and moved into operative situation by the setting of the actuating-lever to retard its return movement.

5. In a photographic shutter, a casing, exposing-blades therein, an operating-lever for the exposing-blades pivoted in the casing, and means supported in the casing and moved into operative situation by the setting of the operating-lever and adapted to retard its return movement, the operative situation of said means being variable to graduate the return movement of the operating-lever.

6. In a photographic shutter, a casing, exposing-blades therein, an operating-lever for the exposing-blades pivoted in the casing, a pin carried by the operating-lever, a second lever supported in the casing and normally out of the path of movement of said pin, and a dash-pot to which said latter lever is connected.

7. In a photographic shutter, the combination, with the actuating-lever provided with an adjustable pin, of the pivoted lever having a lug adapted to engage with the pin, the dash-pot having a movable plunger connected with the pivoted lever, and the spring on the pivoted lever.

8. In a photographic shutter, exposing-blades, an actuating-lever therefor, mechanism to retard the movement of said actuating-lever in one direction, and a timing-pin carried by said lever for coöperation with said mechanism.

9. In a photographic shutter, exposing-blades, an actuating-lever therefor, mechanism to retard the movement of said actuating-lever in one direction, a timing-pin carried by said lever for coöperation with said mechanism, and an adjusting-nut for said pin.

10. The combination with the actuating lever and spring, of the movable blades, suitable mechanism for operating the blades, the exposing lever and catch, the adjustable pin on the actuating-lever, the pivoted lever having a lug adapted to engage with the pin, and the dash-pot having a movable plunger connected with the lever, as and for the purposes set forth.

11. In a photographic shutter, a spring-actuated operating-lever having a cam-slot with opposite inclined portions, and having a groove in the back face of the said operating-lever connecting the extreme ends of the said slot, and which groove is varying in its depth and deepest adjacent to the end of the said cam-slot, substantially as and for the purposes set forth.

HENRY H. TURNER.
VICTOR CLARK.

Witnesses:
GEORGE B. SELDEN,
C. G. CRANNELL.